Figure 1:
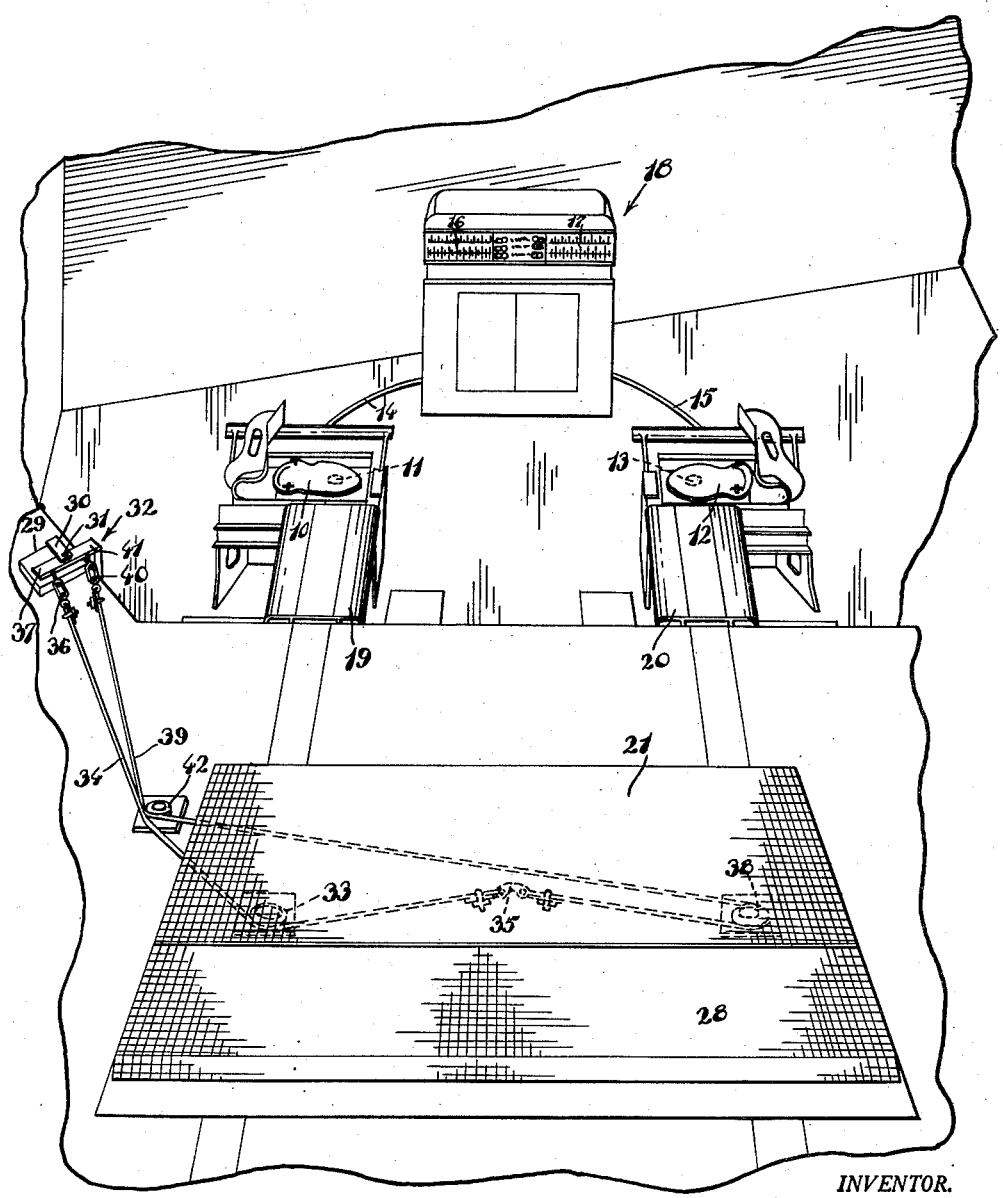

Feb. 4, 1958 R. V. RETHERFORD 2,821,790
SHIFTABLE PLATFORM FOR WHEEL ALIGNING MACHINE
Filed Jan. 23, 1956 2 Sheets-Sheet 1

INVENTOR.
Roy Vernon Retherford
BY: Harold B Hood
ATTORNEY

Feb. 4, 1958   R. V. RETHERFORD   2,821,790
SHIFTABLE PLATFORM FOR WHEEL ALIGNING MACHINE
Filed Jan. 23, 1956   2 Sheets-Sheet 2

INVENTOR.
ROY VERNON RETHERFORD
BY: Harold B. Hood
ATTORNEY

United States Patent Office 2,821,790
Patented Feb. 4, 1958

2,821,790

SHIFTABLE PLATFORM FOR WHEEL ALIGNING MACHINE

Roy Vernon Retherford, Connersville, Ind.

Application January 23, 1956, Serial No. 560,628

1 Claim. (Cl. 33—203.12)

The present invention relates to a shiftable platform for wheel-aligning machines, and is particularly concerned with the provision of means for facilitating the use of devices for assisting in the adjustment of caster, camber, and toe-in of the dirigible wheels of conventional automobiles.

One of the best of such machines or devices now on the market consists of a pair of turntables, mounted for oscillation upon spaced, vertical axes and proportioned and arranged to support the dirigible wheels of a conventional automobile, together with a reading board which is provided with a pair of graduated scales, and indicating means so connected with the respective turntables that the adjusted position of each turntable may be read upon the corresponding scale of the reading board. The particular machine referred to is manufactured by Bear Mfg. Co. of Rock Island, Illinois, and is known as the "Telaliner." In the use of the machine, the relationship between the point currently indicated on one scale and the point currently indicated on the other scale of the reading board is relied upon to determine proper adjustments for caster, camber and toe-in. Obviously, it is desirable, therefore, that the reading on one scale shall coincide exactly with the zero point (or some other specifically-marked point on the scale) when adjustment is initiated.

It is essential that the steering wheel of the vehicle being tested must be set at its precise mid-point when taking certain readings; and it will be obvious that it is impossible always to move the vehicle onto the testing machine in such a position that, when the vehicle is stopped with its dirigible wheels on the turntables, and the steering wheel is so set to its mid-point, a reading of precisely zero will appear on either of the machine scales.

It is the primary object of the present invention, therefore, to provide means whereby, after a vehicle has so been moved on to such a machine, the vehicle may be readily shifted bodily in such a fashion as to bring the reading on one of the machine scales precisely to zero.

While I have referred to the Bear "Telaliner," and the description will be related primarily to that machine, it will be readily understood that many, if not all, of the advantages of the present invention can be realized when the same is used in connection with any other aligning machine comprising a pair of turntables and a reading board including a scale for indicating the current position of each such turntable.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claim is not violated.

Figure 2:
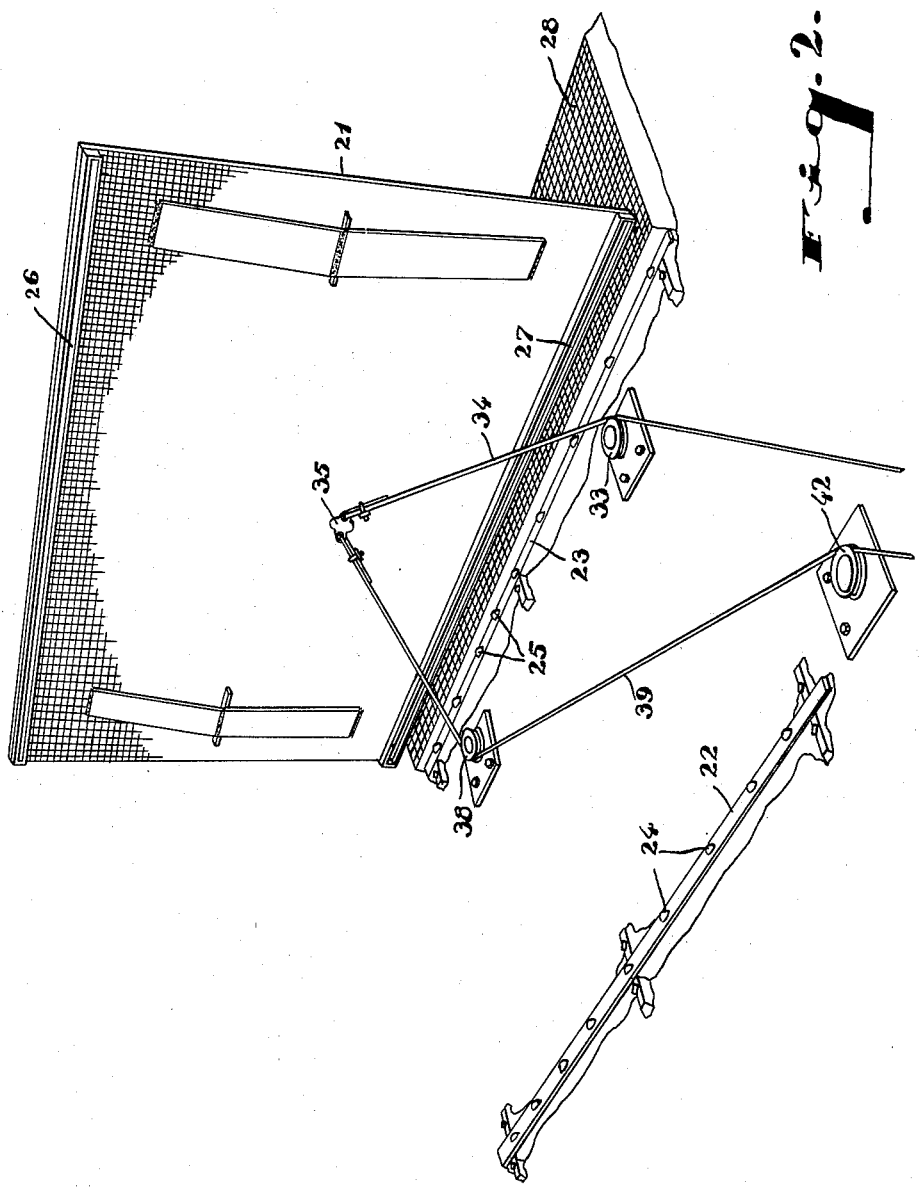

Fig. 1 is a perspective view showing a wheel-aligning machine more or less diagrammatically, and illustrating an embodiment of the present invention in operative association therewith; and Fig. 2 is a perspective view, taken from the upper left-hand corner of the lower portion of Fig. 1, and showing the platform turned onto one edge to expose the supporting and actuating means therefor.

Referring more particularly to the drawings, it will be seen that I have illustrated, more or less diagrammatically, the essential parts of a wheel-aligning machine including a turntable 10 mounted for oscillation about a vertical axis 11 and a turntable 12 mounted for oscillation about a vertical axis 13, said turntables being so spaced apart that the dirigible wheels of a conventional automobile may be supported thereon substantially in registry with the axes 11 and 13. Cables 14 and 15 provide operative connections between the turntables 10 and 12, respectively, and indicator means associated with the scales 16 and 17 arranged on the adjacent face of a cabinet 18. Since the structural and operational details of the indicator means are known and form no part of the present invention, they are not illustrated or described herein. Suffice it to say that, when the machine is in operation, the indicator means associated with the scale 16 will always indicate the adjusted position of the turntable 10 about its axis 11 while the indicator means associated with the scale 17 will always indicate the adjusted position of the turntable 12 about its axis 13. Short ramps 19 and 20 lead to the respective turntables 10 and 12.

According to the present invention, I provide a platform 21 so spaced from, and related to, the turntables 10 and 12 that, when the dirigible wheels of any conventional automobile are supported upon the said turntables, the other two wheels of the vehicle will rest upon the platform 21. While I have shown the platform 21 as a single sheet of any suitable material, for instance, steel plate, it will be obvious that the platform means could provide separate elements for supporting the respective wheels, said elements being arranged, in any suitable manner, to move concurrently.

In any suitable way, the platform is mounted for movement, in either direction, upon a line substantially parallel with a line joining the axes 11 and 13 of the turntables 10 and 12. In the illustrated embodiment of the invention, I provide a trackway comprising parallel rails 22 and 23 fixedly supported upon the floor of the building in which the aligning machine is housed. The rails 22 and 23 are substantially parallel with the above-mentioned line joining the axes 11 and 13; and preferably the trackway defined by those rails will be provided with anti-friction means for supporting the platform 21. As shown, the rail 22 supports a series of ball bearings 24 and the rail 23 supports similar bearings 25, while the lower surface of the platform 21 has secured thereto channels 26 for receiving the balls 24 and 27 for receiving the balls 25. Thus, the platform 21 is supported and guided for ready movement along the trackway comprising the rails 22 and 23 and the anti-friction bearings 24 and 25.

Preferably, a short ramp 28 is arranged adjacent that edge of the platform 21 remote from the turntables 10 and 12 to facilitate movement of a vehicle's wheels onto the platform 21; and, if desired, a further ramp or stationary platform (not shown) may be arranged between the platform 21 and the ramps 19 and 20.

During the use of the machine for properly adjusting wheel alignment, a mechanic will be working near the front wheels of the vehicle, and thus near the turntables 10 and 12. At a point closely adjacent one or the other of those turntables, I prefer to provide an operating station for the platform 21. As shown, a base 29 is fixed to the floor adjacent the turntable 10, and said base supports a bracket 30 which, together with the base 29, forms a support for a pivot 31 upon which is oscillably mounted, intermediate its ends, a lever 32. Near one end of the platform 21, and preferably beneath the platform, a pulley 33 is mounted upon a fixed axis; and a flexible cable 34 has one end connected to a bracket 35, shown fixedly secured to the lower surface of the platform 21 adjacent the longitudinal mid-point of that platform. The cable 34 is trained about the pulley 33 and has its opposite end fixed to a turnbuckle 36 secured to one arm 37 of the lever 32.

Near the opposite end of the platform 21, and preferably beneath the platform, a pulley 38 is mounted on a fixed axis; and a flexible cable 39 has one end attached to the bracket 35, is trained about the pulley 38, and has its opposite end connected to a turnbuckle 40 secured to the other arm 41 of the lever 32. In the illustrated installation, a further pulley 42 provides an additional guide for the cable 39.

It will be seen that, if the lever 32 is moved in a clockwise direction, as viewed from above in Fig. 1, the platform 21 will be moved to the left; and if the lever is moved in a counter-clockwise direction, the platform 21 will be moved to the right.

It will now be apparent that, through the medium of the mechanism herein disclosed, an automobile, having its front wheels supported upon the turntables 10 and 12, can be bodily shifted to oscillate those turntables to any desired degree, by manipulation of the lever 32. Thus, if it is found, after an automobile to be tested has been driven onto the machine, that neither of the scales 16 and 17 registers zero, the lever 32 may be manipulated, to shift the rear end of the automobile laterally, thereby slightly moving the turntables 10 and 12, until one of the scales 16 or 17 does register precisely zero. Thereafter, the aligning machine will be used in conventional fashion, but without the necessity of making mental calculations or estimates to determine proper relationships between the indications on the scales 16 and 17.

I claim as my invention:

For use with a wheel-aligning machine which includes a pair of turntables proportioned and arranged to support the dirigible wheels of an automobile, a reading board having a pair of calibrated scales thereon, and means operatively connecting said turntables respectively to indicator means associated with said scales whereby the adjusted position of each turntable may be read upon the corresponding scale, the invention which comprises platform means so spaced from said turntables that, when the dirigible wheels of a conventional automobile are supported respectively on said turntables, the other two wheels of said vehicle will be supported on said platform means, trackway means supporting said platform means for movement in either of two opposite directions along a line substantially parallel with a line joining the rotational axes of said turntables, a lever pivotally supported intermediate its ends closely adjacent said turntables, pulley means journalled on a fixed axis adjacent one end of said platform means, a flexible cable attached to said platform means near the longitudinal center thereof, trained about said pulley means and connected to one arm of said lever, a second pulley means journalled on a fixed axis adjacent the other end of said platform means, and a second flexible cable attached to said platform means near the longitudinal center thereof, trained about said second pulley means and attached to the other arm of said lever.

References Cited in the file of this patent
UNITED STATES PATENTS

| 2,091,656 | Smalley | Aug. 31, 1937 |
| 2,702,432 | Martin | Feb. 22, 1955 |
| 2,765,540 | MacMillan et al. | Oct. 9, 1956 |